US007906970B2

United States Patent

(12) United States Patent
Gangadharan et al.

(10) Patent No.: US 7,906,970 B2
(45) Date of Patent: Mar. 15, 2011

(54) CURRENT DIFFERENTIAL PROTECTION RELAYS

(75) Inventors: Pradeep Kumar Gangadharan, Tamil Nadu (IN); Tarlochan Singh Sidhu, London (CA)

(73) Assignee: Areva T&D UK Limited, Stafford (GB)

( * ) Notice: Subject to any disclaimer, the term of this patent is extended or adjusted under 35 U.S.C. 154(b) by 435 days.

(21) Appl. No.: 12/167,479

(22) Filed: Jul. 3, 2008

(65) Prior Publication Data

US 2009/0009181 A1 Jan. 8, 2009

(30) Foreign Application Priority Data

Jul. 6, 2007 (GB) .................................. 0713126.1

(51) Int. Cl.
*G01R 31/327* (2006.01)
*G01R 31/08* (2006.01)
*H01H 47/00* (2006.01)

(52) U.S. Cl. .......................... 324/418; 324/522; 361/170

(58) Field of Classification Search .................. 324/522, 324/512, 500, 415, 418, 424; 361/160, 170, 361/184, 206, 35, 36, 38, 42, 45, 62, 63, 361/78

See application file for complete search history.

(56) References Cited

U.S. PATENT DOCUMENTS 3,609,523 A * 9/1971 Knox .......................... 324/424
4,825,326 A * 4/1989 Andow et al. .................... 361/63
6,442,010 B1 * 8/2002 Kasztenny et al. ............ 361/63
6,829,544 B1 * 12/2004 Kasztenny et al. ............ 702/59
7,812,615 B2 * 10/2010 Gajic et al. .................... 324/547
2010/0208403 A1 * 8/2010 Das et al. ........................ 361/94

FOREIGN PATENT DOCUMENTS

WO 2007027598 A1 3/2007

* cited by examiner

*Primary Examiner* — Hoai-An D Nguyen
(74) *Attorney, Agent, or Firm* — Nixon Peabody LLP

(57) ABSTRACT

In the field of current differential protection relays there is a need for improvements in or relating to the protection relays to allow them to accommodate current transformer saturation while maintaining a desired degree of reliability. A method of operating a current differential protection relay following a fault, the protection relay being electrically coupled to a protection zone of an electrical power system, comprises the steps of establishing a fault condition by discriminating between an internal fault inside the protection zone and an external fault outside the protection zone; and modifying the sensitivity of the protection relay according to the nature of the fault condition.

23 Claims, 6 Drawing Sheets

CURRENT DIFFERENTIAL PROTECTION RELAYS

CROSS REFERENCE TO RELATED APPLICATIONS OR PRIORITY CLAIM

This application claims priority to UK Patent Application No. 07 13126.1, filed Jul. 6, 2007.

TECHNICAL FIELD

This invention relates in particular, but not exclusively, to a method of operating a current differential protection relay that is electrically coupled to a protection zone of an electrical power system, methods of protecting a protection zone of various electrical power systems having current differential protection relays electrical coupled thereto, and a current differential protection relay.

The protection zone may include transmission lines having two terminal ends or, for example, one or more transformers, busbars, or motors.

DESCRIPTION OF THE INVENTION

The electrical elements mentioned above are essential components of an electrical power transmission system and may be protected using line current differential protection relays, each of which is electrically coupled to the electrical element via a current transformer. On detecting a fault a given protection relay trips to isolate the electrical element lying within the protection zone.

Inaccuracies created by a current transformer and saturation of the current transformer can lead to spurious tripping of the protection relay electrically coupled thereto. This is undesirable as it interrupts the supply of electrical power and so reduces the security of the electrical power system.

One method which attempts to deal with the problems that occur when the current transformer becomes saturated involves reducing the sensitivity of an associated current differential protection relay on detection of current transformer saturation, thereby reducing the likelihood of spurious tripping of the protection relay.

However, one drawback with this method is that reducing the sensitivity of the protection relay also reduces the ability of the protection relay to detect a fault requiring isolation of the protection zone, thus reducing the reliability of the protection relay.

Therefore, there is a need for an improved method of operating a current differential protection relay which is able to accommodate current transformer inaccuracies and saturation while maintaining a desired degree of reliability.

According to a first aspect of the invention there is provided a method of operating a current differential protection relay following a fault, the protection relay being electrically coupled to a protection zone of an electrical power system, comprising the steps of:

establishing a fault condition by discriminating between an internal fault inside the protection zone and an external fault outside the protection zone; and modifying the sensitivity of the protection relay according to the nature of the fault condition.

Modifying the sensitivity of the protection relay according to the nature of the fault condition allows the protection relay to adapt to the fault condition and so maintains the ability of the protection relay to identify faults requiring isolation, i.e. requiring tripping of the protection relay, while reducing the likelihood of spurious tripping. Consequently the protection relay is able to accommodate current transformer inaccuracies and considerable current transformer saturation while maintaining a desired degree of reliability.

Preferably the first method of the invention includes further steps as defined in dependent Claims 2 to 16.

According to a second aspect of the invention there is provided a method of protecting a protection zone of an electrical power system having at least one current differential protection relay electrically coupled therewith, comprising the step of operating the or each protection relay according to the steps set out in any of Claims 1 to 16.

According to a third aspect of the invention there is provided a method of protecting a protection zone of a three phase electrical power system, the protection zone being defined by a group of three local current transformers lying at one end of the protection zone and a second group of three remote current transformers lying at another end of the protection zone, each current transformer being electrically coupled to a phase of the electrical power system and having a current differential protection relay electrically coupled thereto, the method comprising the step of operating each protection relay according to the steps set out in any of Claims 1 to 16.

Preferably the third method of the invention includes further steps as defined in dependent Claims 19 to 24.

BRIEF DESCRIPTION OF THE DRAWINGS

There now follows a brief description of a preferred embodiment of the invention, by way of non-limiting example, with reference to the accompanying drawings in which.

DETAILED DESCRIPTION OF SPECIFIC EMBODIMENTS

Figure 1:
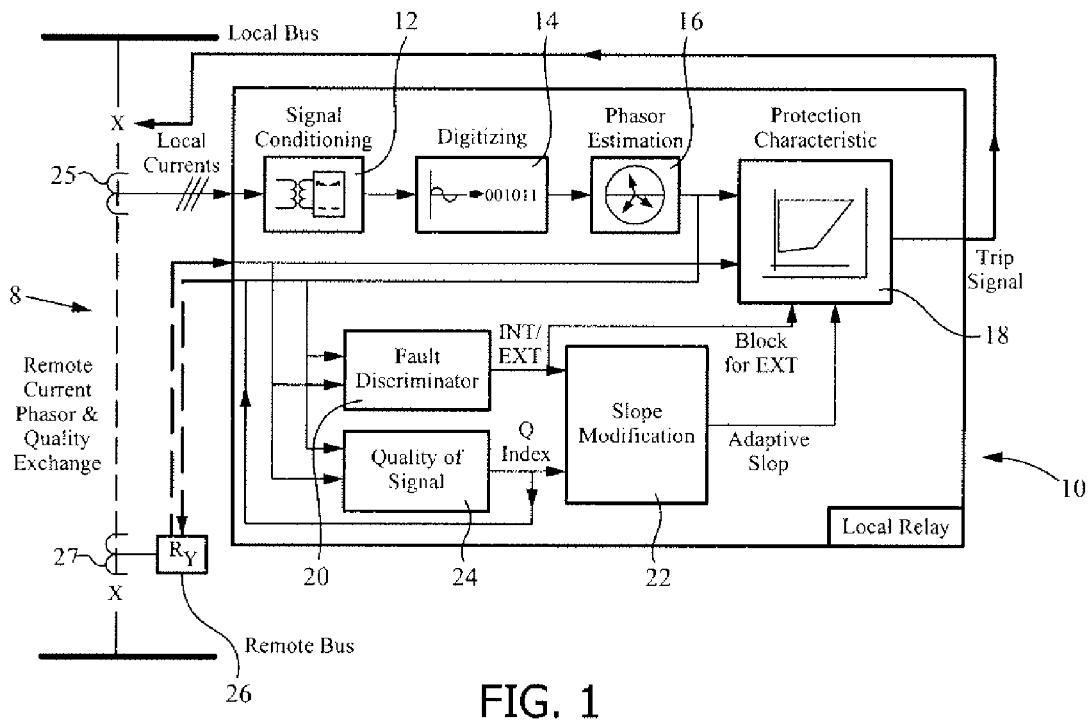
FIG. 1 shows a schematic view of part of a three phase electrical power system including current differential protection relays according to an embodiment of the invention.

FIG. 1 shows a schematic view of a protection zone 8 in a three phase electrical power system.

The protection zone 8 is defined by a first group of three, local current transformers, one for each phase, (only one local current transformer 25 is shown in FIG. 1) lying at one end of the protection zone 8, and a second group of three, remote current transformers, one for each phase, (only one remote current transformer 27 is shown in FIG. 1) lying at the other end of the protection zone.

Each local current transformer 25 is electrically coupled to a protection relay (only one protection relay 10 is shown schematically in FIG. 1), and each remote current transformer 27 is electrically coupled to a further protection relay (only one further protection relay 26 is identified in FIG. 1). Each protection relay 10, 26 has the same configuration as the protection relay 10 shown in FIG. 1.

In practice the three protection relays 10, 26 for the three phases at a given end of the protection zone may be combined into a single relay module (not shown) having three separate "relay phases" which function in the same way as discrete protection relays. However for the sake of clarity the protection relay for each phase will be considered as a discrete element throughout the remainder of this text.

As shown schematically in FIG. 1, each protection relay 10 includes a conventional signal conditioning module 12, digitizing module 14, phasor estimation module 16, and a bias characteristic module 18.

In addition, each protection relay 10 includes a fault discriminator module 20, a sensitivity modifying module 22, and an index generating module 24.

In use, each fault discriminator module 20 establishes a fault condition by discriminating between an internal fault inside the protection zone and an external fault outside the protection zone.

Figure 2:
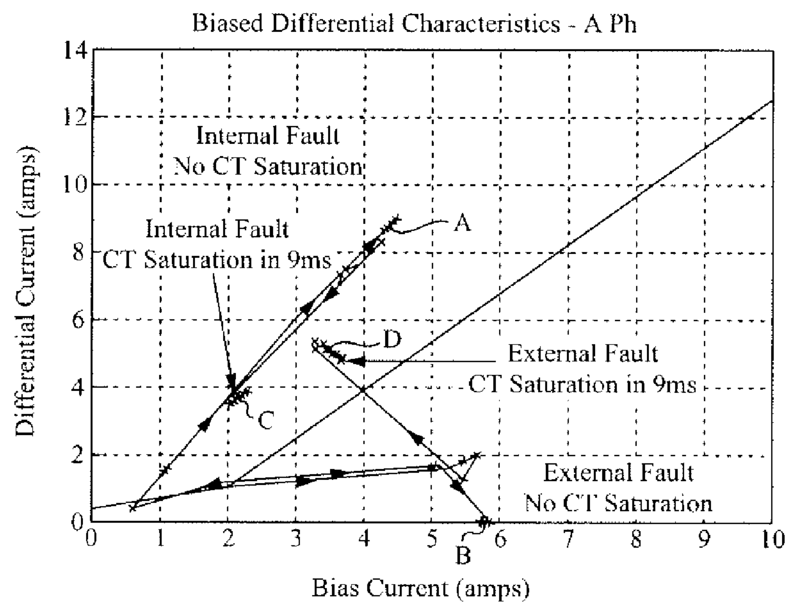
FIG. 2 shows a bias-differential current plane for one of the protection relay shown in FIG. 1 during various fault situations.

Establishing a fault condition includes evaluating the change with time of an operating characteristic of the corresponding protection relay 10 in a bias-differential current plane, as shown in FIG. 2.

As can be seen in FIG. 2, the trajectory of the protection relay's operating characteristic in the bias-differential current plane, i.e. the way the protection relay's operating point in the bias-differential current plane changes with time, differs for internal and external faults.

A discrete Fourier transform (DFT) filter is used to extract the phasor details of the operating characteristic, and preferably a one-cycle DFT filter is used for this phasor estimation. Such a filter provides four sample points for the operating characteristic from a load point to a fault point if the current transformer is not saturated, as shown in plot A for an internal fault and plot B for an external fault. If the current transformer is saturated then the operating characteristic will continue to change as the estimated phasor changes due to various levels of saturation in the subsequent cycles of the faulted waveform, as shown in plot C for an internal fault and plot D for an external fault.

A preferred sampling frequency for the DFT filter is 48 samples per cycle, although other embodiments of the invention may use a different sampling frequency. Furthermore, in the embodiment described the protection relays 10 coupled to the local current transformers 25 and the further protection relays 26 coupled to the remote current transformers 27 communicate with one another at a frequency of 4 times per cycle. In other embodiments however, the protection relays 10, 26 may communicate with one another at a different frequency.

Evaluating the change with time of an operating characteristic of the protection relay 10, so as to establish a fault condition, further includes determining a first change in the bias current of the protection relay 10 according to, $$\Delta I_{BIAS,P}(n)=|I_{BIAS,P}(n)-I_{BIAS,P}(n-1)|$$

where, $I_{BIAS}$ is the bias current for the phase,

P is the phase index (A, B or C), and n is the index of the protection calculation cycle @ 4 times/cycle (n=1, 2, . . . ), determining a first change in the differential current of the protection relay according to, $$\Delta I_{DIFF,P}(n)=I_{DIFF,P}(n)-I_{DIFF,P}(n-1)$$

where, $I_{DIFF}$ is the differential current for the phase, determining a second change in the bias current and a second change in the differential current as, $$\Delta 2I_{BIAS,P}(n)=|I_{BIAS,P}(n)-I_{BIAS,P}(n-2)|$$

$$\Delta 2I_{DIFF,P}(n)=I_{DIFF,P}(n)-I_{DIFF,P}(n-2)$$

and calculating a first ratio of the first change in differential current to the first change in bias current according to, $$DeltaRatio_P(n)=\frac{\Delta I_{DIFF,P}(n)}{\Delta I_{BIAS,P}(n)}$$

calculating a second ratio of the second change in differential current to the second change in bias current according to, $$2DeltaRatio_P(n)=\frac{\Delta 2I_{DIFF,P}(n)}{\Delta 2I_{BIAS,P}(n)}$$

The fault discriminator module 20 establishes an internal fault condition when the first ratio is great than or equal to a first threshold value, which is preferably 1, or the second ratio is greater than or equal to a second threshold value, which is preferably 0.8.

The fault discriminator module 20 establishes an external fault condition when the first ratio is less than a third threshold value, which is preferably 0.6, and an internal fault condition was not established during the preceding calculation cycle.

Preferably the first, second and third threshold values are predetermined according to the nature of the electrical power system, including factors such as the operating conditions and dimensioning of the current transformers. The sampling frequency (48 samples per cycle in the embodiment described) and the frequency at which the protection relays 10, 26 communicate with one another (4 times per cycle in the embodiment described) can also impact on the desired level of the first, second and third threshold values.

In the embodiment described, establishing a fault condition also includes a validation step in which an internal or external fault condition is only established if the first change in bias current is greater than a first design threshold value, or the first change in differential current is greater than a second design threshold value. Such validation is desirable as it avoids operation of the protection relay 10, i.e. tripping of the protection relay 10, during normal load variation and so helps to maintain the security of the electrical power system.

Preferably the first design threshold is determined according to, $$\frac{A \times fs}{fc}$$

where,

A is 0.01 of $I_n$ (the secondary rated current of the current transformer to which the protection relay is electrically coupled)

$f_s$ is the sampling frequency (48 samples per cycle in the embodiment described), and $f_c$ is the frequency at which the protection relays communicate with one another (4 times per cycle in the embodiment described), while the second design threshold is determined according to, $$\frac{B \times fs}{fc}$$

where,

B is 0.004 of $I_n$ (the secondary rated current of the current transformer to which the protection relay is electrically coupled).

In other embodiments of the invention the first and second design thresholds may differ from those outlined above.

In the embodiment described, establishing a fault condition further includes a confirmation step in which an internal fault condition is only established when the first ratio is greater than or equal to the first threshold value or the second ratio is greater than or equal to the second threshold value, and the first change in bias current is greater than a first design threshold value or the first change in differential current is greater than a second design threshold value for two consecutive calculation cycles.

Establishing a fault condition also includes re-establishing a fault condition following a predetermined delay.

In the case of the fault discriminator module 20 establishing an internal fault condition, the fault discriminator module 20 may reset the fault condition if, for example, a "no-decision" state, i.e. neither an internal fault condition or an external fault condition is established, is continuously present for 100 ms.

The fault discriminator module 20 may also reset the fault condition in the case of an external fault being established if the no-decision state is continuously present for 100 ms.

In the case of an internal fault condition being established, the fault discriminator module 20 may change the fault condition to an external fault condition if an external fault is established continuously for 60 ms.

The fault discriminator 20 may also change an external fault condition to an internal fault condition if an internal fault condition is established continuously for 40 ms.

In other embodiments of the invention the delay periods may differ to those set out above.

Including the step of re-establishing a fault condition following a predetermined delay allows the protection relay to react quickly to changes in the fault condition in order to correctly trip in the event of a further subsequent fault requiring such action.

Following establishment of a fault condition, the sensitivity modifying module 22 modifies the sensitivity of the protection relay 10, 26 according to the nature of the fault condition.

Modifying the sensitivity of the protection relay 10, 26 includes increasing the sensitivity following establishment of an internal fault condition, and decreasing the sensitivity following establishment of an external fault condition.

Figure 6:
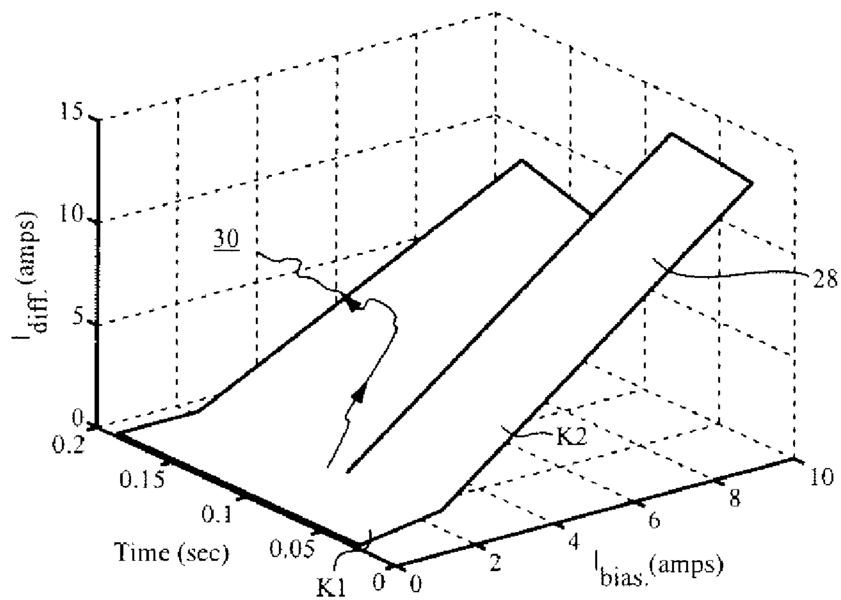
FIG. 6 shows a bias characteristic slope of one of the protection relays referred to in FIG. 3 during the first fault situation.

Increasing the sensitivity of the protection relay 10, 26 includes reducing the angle of inclination of a bias characteristic slope 28 of the protection relay 10, 26, as shown in FIG. 6 for example.

Figure 7A:
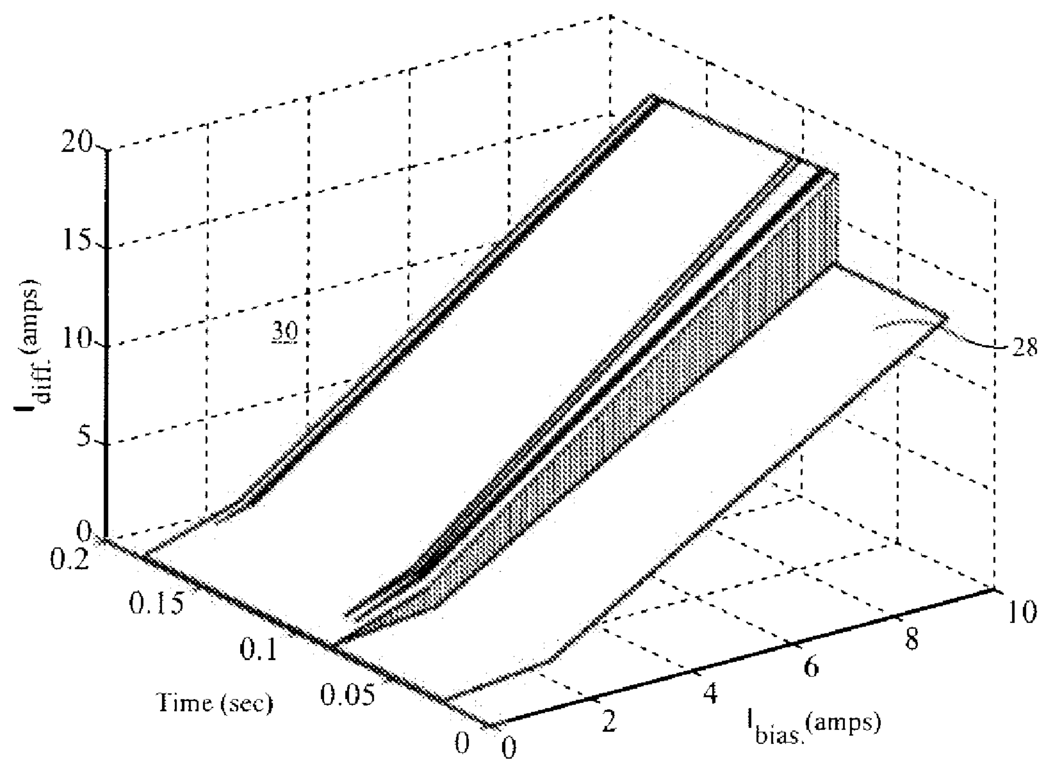
FIGS. 7(*a*) and 7(*b*) show a bias characteristic slope of one of the protection relays shown in FIG. 1 during a second fault situation.
Figure 7B:
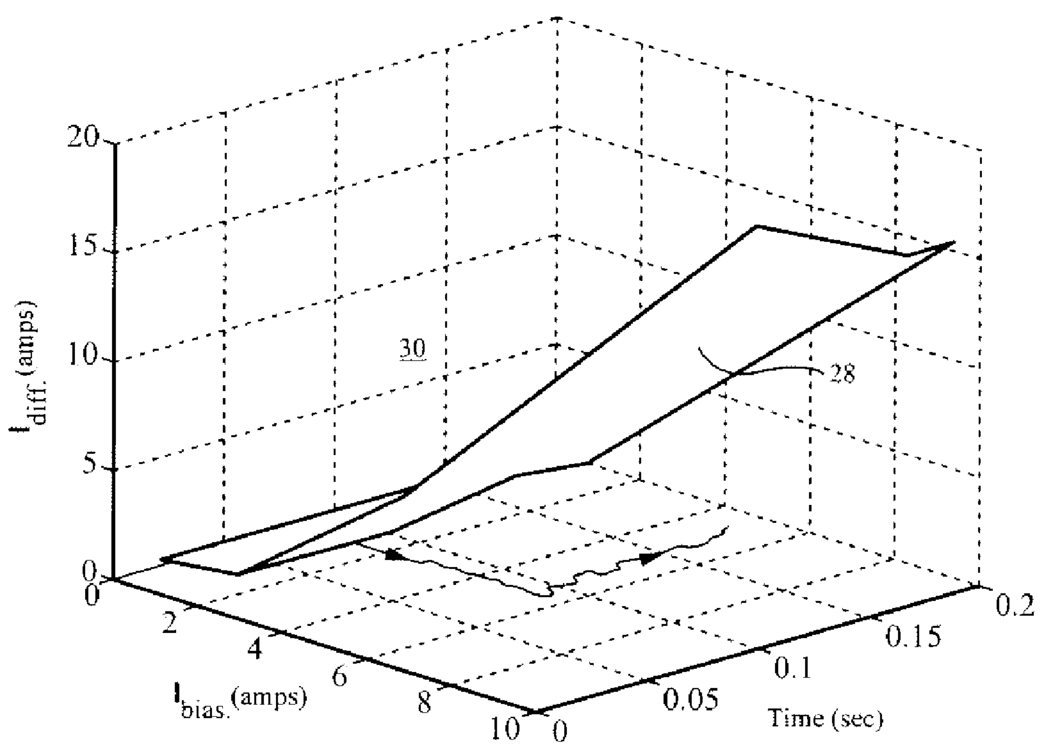

Reducing the sensitivity of the protection relay 10, 26 includes increasing the angle of inclination of the bias characteristic slope 28 of the protection relay 10, 26, as shown in FIG. 7(*a*) for example.

In the case of an internal fault condition, particularly one in which the current transformer is saturated, the magnitude of the signal sampled by the protection relay 10, 26 may be reduced which would normally make it difficult for the protection relay 10, 26 to determine whether tripping, i.e. isolation of the current transformer, is required. Increasing the sensitivity of the protection relay 10, 26, as outlined above, helps overcome this problem.

In contrast, in the case of an external fault condition tripping of the protection relay 10, 26 can be undesirable as this would interrupt supply to the protection zone. As a result the sensitivity of the protection relay 10, 26 is decreased so as to decrease the likelihood of erroneous tripping.

Following establishment of an internal fault condition and subsequent modification of the sensitivity of the protection relay 10, 26, the method of the invention described further includes tripping the protection relay 10, 26 if an operating characteristic of the protection relay 10, 26 enters a trigger region 30 which lies above the bias characteristic slope 28.

Alternatively, following establishment of an external fault condition and subsequent modification of the sensitivity of the protection relay 10, 26, the method of the invention described further includes inhibiting tripping of the protection relay 10, 26 that establishes the external fault condition.

The method described also includes steps to vary the extent to which the sensitivity of the protection relay 10, 26 is modified according to the magnitude of an index value.

Generating the index value is done according to the extent to which a sampled protection relay 10, 26 input current signal deviates from a predetermined waveform.

More specifically, generating the index value includes the steps of determining a phasor magnitude of the current signal using, for example, a full cycle DFT filter according to, $$I_{MAG,P}(m) = \left| \frac{1}{24} \sum_{k=0}^{47} I_P(m-k) \times e^{-j\frac{2\pi k}{48}} \right|$$

where, $I_P$ is the phase current sample, and

M is the index of the samples (m=1, 2, . . . ) @ 48 samples/cycle, determining a RMS value of the current signal according to, $$I_{RMSP}(m) = \sqrt{\frac{\sum_{k=0}^{47} I_P^2(m-k)}{24}}$$

and calculating the index value, $Q_p(m)$ according to, $$Q_P(m) = \frac{I_{RMS,P}(m) - I_{MAG,P}(m)}{I_{RMS,P}(m)}$$

The index value is only generated when the phasor magnitude is greater than a third design threshold value, which is preferably $0.01I_n$. This avoids the problem of the index value being very large for small levels of current which the sampling device has difficulty resolving.

An index value is calculated by a corresponding protection relay 10, 26 for each phase and is communicated to the other protection relays 10, 26 together with the phasor magnitude and phase angle.

In the electrical power system described above, i.e. including local and remote current transformers 25, 27 and associated protection relays 10, 26, following establishment of an external fault condition the angle of inclination of each portion K1, K2 of the bias characteristic slope 28 of each protection relay 10, 26 is increased by a common factor.

The common factor is determined by summing the magnitude of the index values for the protection relay 10 and further protection relay 26 of a given phase, and taking the maximum summed value of these three pairs of protection relays 10, 26 according to, $$F(n)=\max[|Q_{A1}(n)|+|Q_{A2}(n)|,|Q_{B1}(n)|+|Q_{B2}(n)|,|Q_{C1}(n)|+|Q_{C2}(n)|]$$

$$K1_A(n)=K1_B(n)=K1_C(n)=K1+F(n)$$

$$K2_A(n)=K2_B(n)=K2_C(n)=K2+F(n)$$

Following establishment of an internal fault condition the angle of inclination of each portion K1, K2 of the bias characteristic slopes 28 of each pair of protection relays 10, 26 of a given phase is decreased by a factor equal to the sum of the magnitude of the index values for the pair of protection relays 10, 26 according to, $$F_P(n)=|Q_{P1}(n)|+|Q_{P2}(n)|$$

$$K1_P(n)=\max[K1-F_P(n),0]$$

$$K2_P(n)=\max[K2-F_P(n),0]$$

In addition, a lower limit of 0 is applied to the angle of inclination of the two portions K1, K2 of the bias characteristic slopes for each pair of protection relays 10, 26 of a given phase. This is in order to avoid having negative bias characteristic slopes.

Operation of the method described will now be explained in the context of different fault situations in which a current transformer is saturated and also in which no current transformers are saturated.

Since the angle of inclination of the bias characteristic slope 28 for a given protection relay 10, 26 varies with time, it is necessary to represent the operating point of the protection relay 10, 26 in the bias differential current plane in a three-dimensional plot, with time as the third axis.

A first fault situation involving a fault inside the protection zone 8 without current transformer saturation will now be described with reference to FIGS. 3 to 6.

Figure 3:
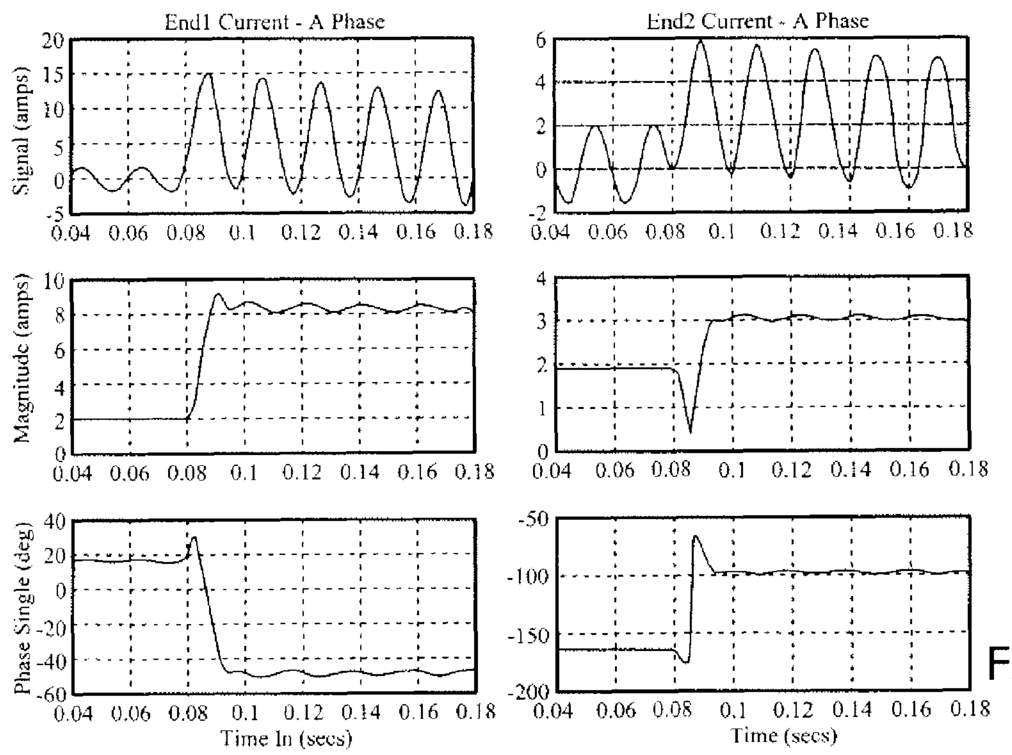
FIG. 3 shows the input signal and output of the phasor estimation module, during a first fault situation, of two protection relays of a given phase lying at either end of a protection zone of the electrical power system shown in FIG. 1.

The input signal and the estimated phasors from the output of the phasor estimation module 16 in the protection relay 10 electrically coupled to the local current transformer 25 for one phase, and the protection relay 26 electrically coupled to the remote current transformer 27 for the same phase is shown in FIG. 3. Only one phase (the "A" phase) is shown for clarity since the input signal and the outputs for the other phases B and C would be the same for faults involving them.

Each of the local and remote current transformers 25, 27 are dimensioned high enough, i.e. are sufficiently large, to avoid saturation.

Figure 4:
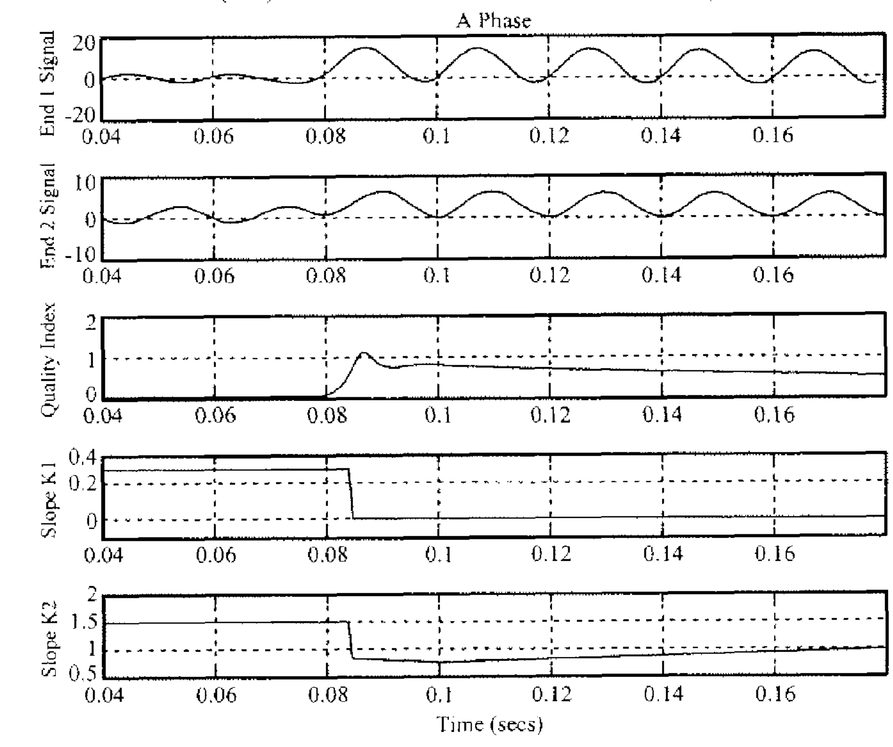
FIG. 4 shows a plot of a final index value and modified portions of a bias differential characteristic slope, during the first fault situation, for the protection relays referred to in FIG. 3.

FIG. 4 shows the plot of the index value and the modified portions K1, K2 of the bias characteristic slope 28. The index value plotted is the sum of the index values of the pair of protection relays 10, 26 in the A phase, and is used to modify the angle of inclination of the slope portions K1, K2. Since the current signals have a very high DC offset after the fault, the calculated index value reaches a maximum value of around 1 and then reduces with time as the DC component in the current signal decays.

Since the fault discriminator module 20 establishes an internal fault condition the angle of inclination of the slope portions K1, K2 is reduced by the index value. However, the reduced slope of portion K1 was negative, and so it is limited to zero.

Figure 5:
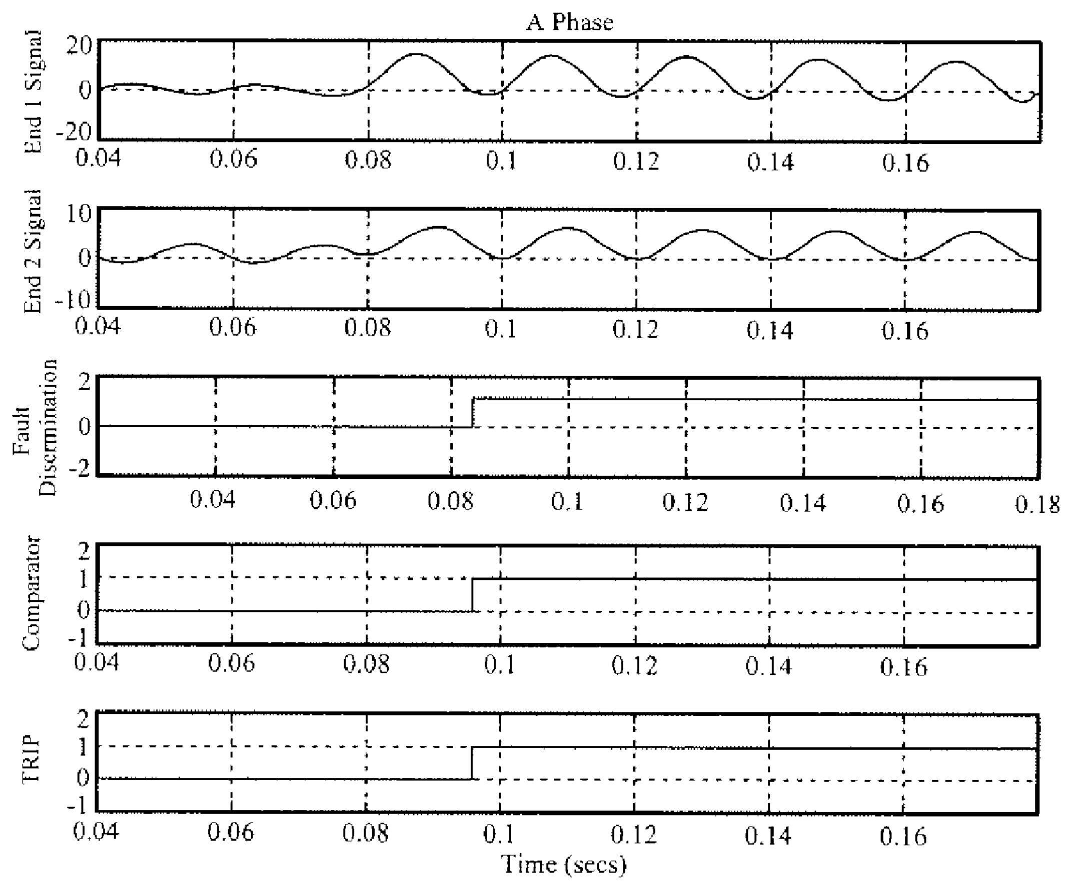
FIG. 5 shows the output of further various modules, during the first fault situation, of the protection relays referred to in FIG. 3.

FIG. 5 shows the output of the fault discriminator module 20, a bias-differential comparator which determines whether the operating characteristic of the protection relay 10, 26 enters the trigger region 30 above the bias characteristic slope 28, and the final trip output. As shown, the fault discriminator module 20 establishes an internal fault condition within half a cycle of the fault inception and the final trip is generated within three-quarters of a cycle of the fault inception.

FIG. 6 shows the bias characteristic slope 28 along with the operating characteristic of the protection relay 10, 26. The angle of inclination of the two portions of the bias characteristic slope 28 is reduced following fault inception by an amount based on the index value.

When the operating characteristic enters the trigger region 30 above the bias characteristic slop 28 the protection relay 10, 26 trips.

A second fault situation involving a fault outside the protection zone 8 without current transformer saturation will now be described with reference to FIGS. 7(*a*) and 7(*b*).

FIGS. 7(*a*) and 7(*b*) show the bias characteristic slope 28 along with the operating characteristic of the protection relay 10, 26. The fault discriminator module 20 establishes an external fault condition, and so the angle of inclination of each portion of the bias characteristic slope 28 is increased, according to the index value, after the fault inception. The operating characteristic of the protection relay 10, 26 remains below the surface of the bias characteristic slope 28 and so the protection relay 10, 26 does not trip.

A third fault situation involving a fault outside the protection zone 8 with current transformer saturation will now be described with reference to FIGS. 8(*a*) and 8(*b*).

Figure 8A:
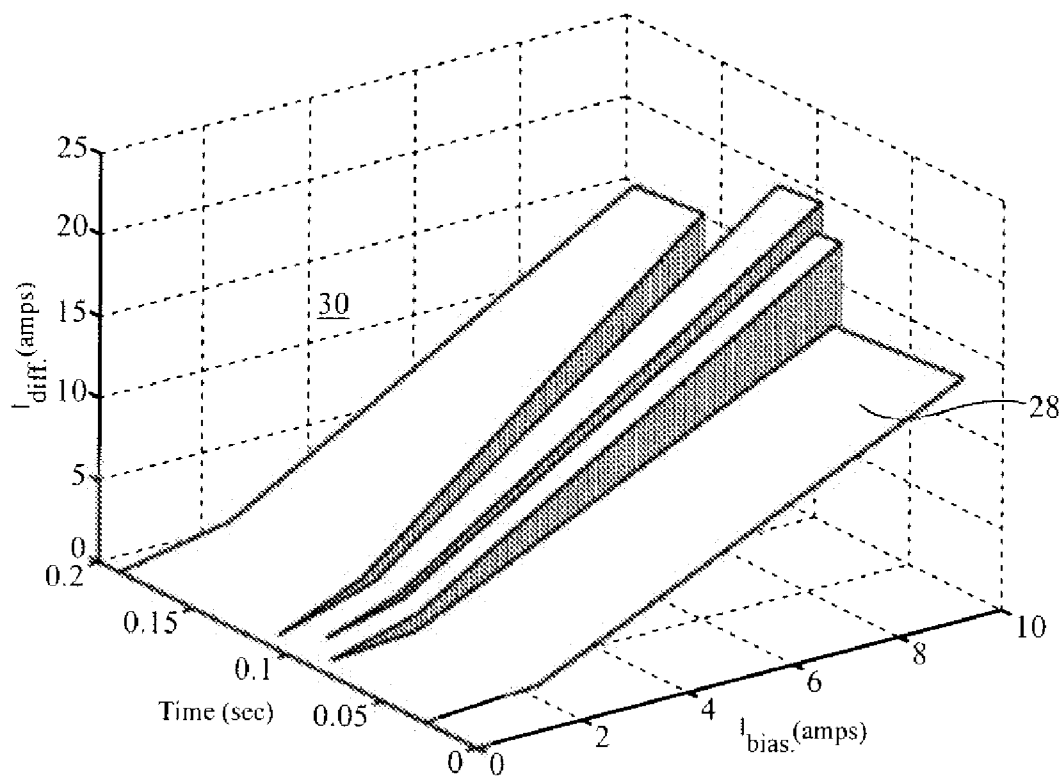
FIGS. 8(*a*) and 8(*b*) show a bias characteristic slope of one of the protection relays shown in FIG. 1 during a third fault situation.
Figure 8B:
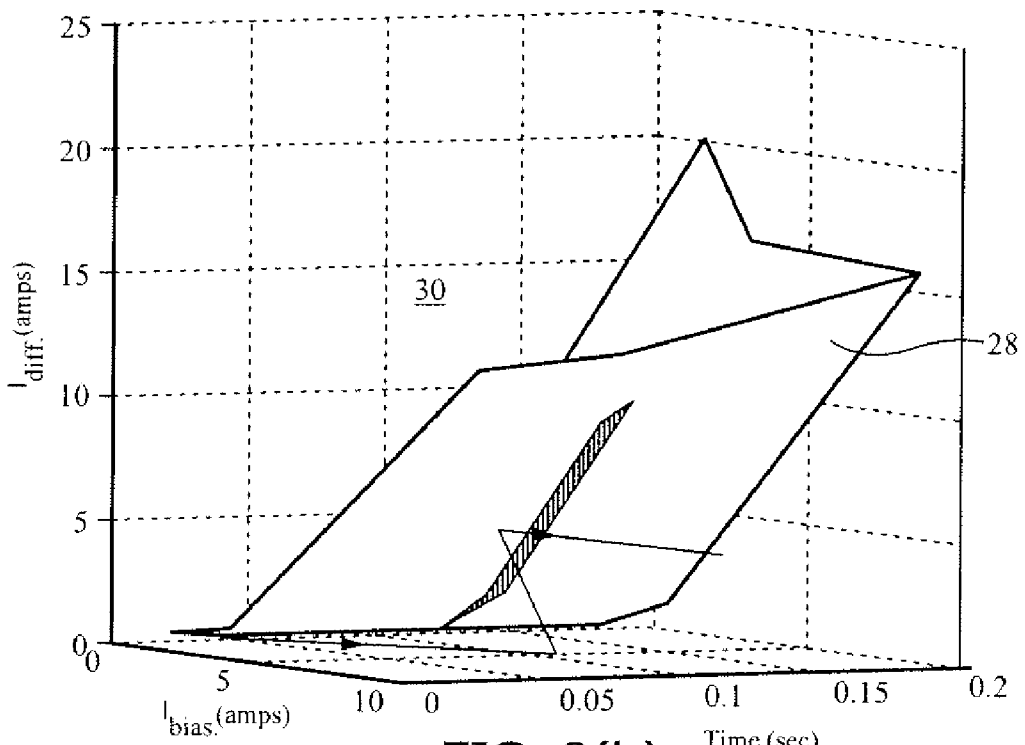

FIGS. 8(*a*) and 8(*b*) show that the sensitivity of the protection relay 10, 26 is reduced by increasing the angle of inclination of each portion of the bias characteristic slope 28 following establishment of an external fault condition. The operating characteristic of the protection relay 10, 26 remains below the surface of the bias characteristic slope and so the protection relay 10, 26 does not trip.

It can be seen from FIG. 8(*b*) that distortions due to current transformer saturation cause the operating characteristic to move towards the trigger region 30. However, since the angle of inclination of each portion of the bias characteristic slope 28 increases, the operating characteristic remains below the slope 28, thereby ensuring that no trip occurs.

A fourth fault situation involving a fault inside the protection zone 8 with current transformer saturation will now be described with reference to FIG. 9.

Figure 9:
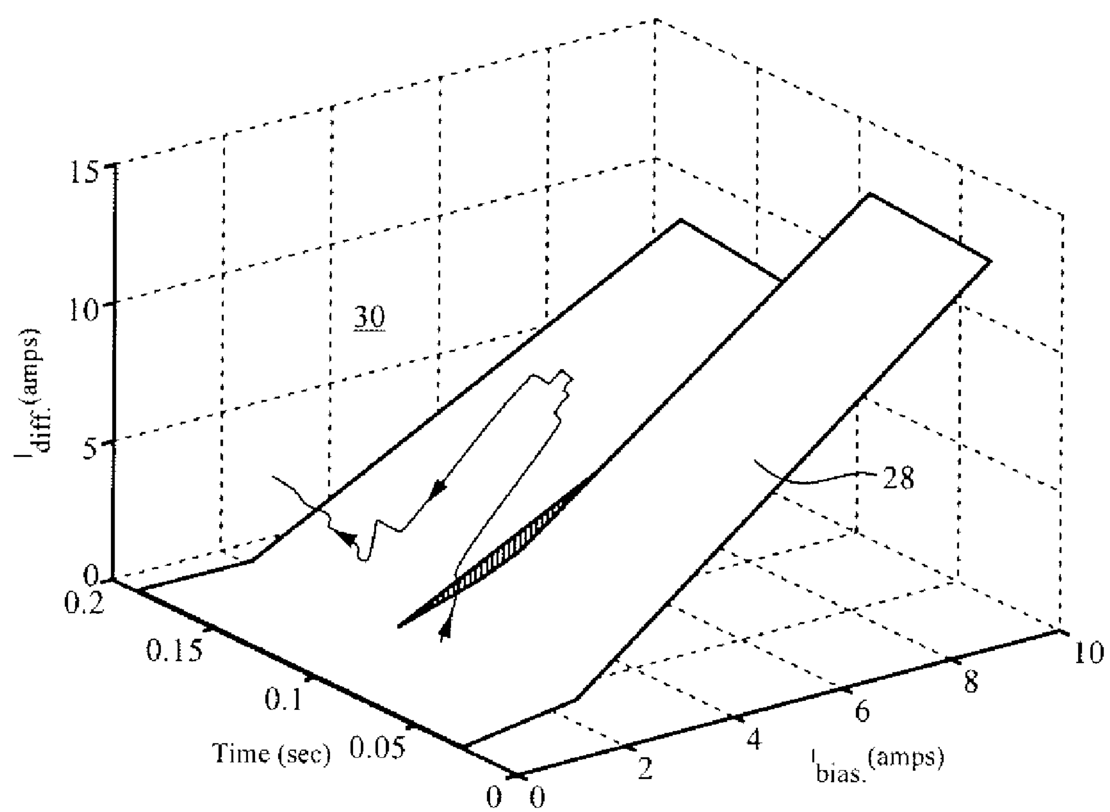
FIG. 9 shows a bias characteristic slope of one of the protection relays shown in FIG. 1 during a fourth fault situation.

FIG. 9 shows the bias characteristic slope 28 along with the operating characteristic of the protection relay 10, 26. The fault discriminator module 20 establishes an internal fault condition, and so increases the sensitivity of the protection relay by decreasing the angle of inclination of each portion of the bias characteristic slope 28 according to the index value. The operating characteristic of the protection relay 10, 26 enters the trigger region 30 and so a trip is generated.

The invention claimed is:

1. A method of operating a current differential protection relay following a fault, the protection relay being electrically coupled to a protection zone of an electrical power system, comprising the steps of:

establishing a fault condition by discriminating between an internal fault inside the protection zone and an external fault outside the protection zone; and modifying the sensitivity of the protection relay according to the nature of the fault condition including increasing the sensitivity following establishment of an internal fault condition and decreasing the sensitivity following establishment of an external fault condition.

2. A method of operating a current differential protection relay according to claim 1, wherein establishing a fault condition includes evaluating the change with time of an operating characteristic of the protection relay in a bias differential current plane.

3. A method of operating a current differential protection relay according to claim 1 wherein establishing a fault condition further includes:

determining first and second changes in the bias current of the protection relay;

determining first and second changes in the differential current of the protection relay;

calculating a first ratio of the first change in differential current to the first change is bias current;

calculating a second ratio of the second change in differential current to the second change in bias current;

establishing an internal fault condition when the first ratio is greater than or equal to a first threshold value, or the second ratio is greater than or equal to a second threshold value; and establishing an external fault condition when the first ratio is less than a third threshold value and an internal fault condition was not established during the preceding calculation cycle.

4. A method of operating a current differential protection relay according to claim 3 further including predetermining the first, second and third threshold values according to conditions in the electrical power system and the physical dimensions of the electrical power system.

5. A method of operating a current differential protection relay according to claim 3 including the step of varying the first, second and third threshold values according to the frequency at which bias and differential currents are sampled.

6. A method of operating a current differential protection relay according to claim 3 further including a validation step wherein establishing an internal fault condition and establishing an external fault condition only occurs if the first change in bias current is greater than a first design threshold value, or the first change in differential current is greater than a second design threshold value.

7. A method of operating a current differential protection relay according to claim 6 further including a confirmation step wherein establishing an internal fault condition only occurs when the first ratio is greater than or equal to the first threshold value or the second ratio is greater than or equal to the second threshold value, and the first change in bias current is greater than a first design threshold value or the first change in differential current is greater than a second design threshold value for two consecutive calculation cycles.

8. A method of operating a current differential protection relay according to claim 1 wherein establishing a fault condition includes re-establishing a fault condition following a predetermined delay.

9. A method of operating a current differential protection relay according to claim 1 wherein increasing the sensitivity of the protection relay includes reducing the angle of inclination of a bias characteristic slope of the protection relay, and reducing the sensitivity of the protection relay includes increasing the angle of inclination of the bias characteristic slope of the protection relay.

10. A method of operating a current differential protection relay according to claim 9 further including tripping the protection relay following establishment of an internal fault condition if an operating characteristic of the protection relay enters a trigger region of the bias-differential current plane, the trigger region lying above the bias characteristic slope.

11. A method of operating a current differential protection relay according to claim 1 further including inhibiting tripping of the protection relay following establishment of an external fault condition.

12. A method of operating a current differential protection relay according to claim 1 further including varying the extent to which the sensitivity of the protection relay is modified according to the magnitude of an index value.

13. A method of operating a current differential protection relay according to claim 12 including generating the index value according to the extent to which a sampled protection relay input current signal deviates from a predetermined waveform.

14. A method of operating a current differential protection relay according to claim 13 wherein generating the index value includes the steps of:

determining a phasor magnitude of the current signal;

determining a RMS value of the current signal; and calculating the ratio of the RMS value minus the phasor magnitude to the RMS value.

15. A method of operating a current differential protection relay according to claim 14 wherein generating the index value only occurs when the phasor magnitude is greater than a third design threshold value.

16. A method according to claim 1, of protecting a protection zone of an electrical power system having at least one current differential protection relay electrically coupled therewith, comprising the step of operating the or each protection relay by establishing a fault condition by discriminating between an internal fault inside the protection zone and an external fault outside the protection zone; and modifying the sensitivity of the protection relay according to the nature of the fault condition including increasing the sensitivity following establishment of an internal fault condition and decreasing the sensitivity following establishment of an external fault condition.

17. A method according to claim 1, of protecting a protection zone of a three phase electrical power system, the protection zone being defined by a group of three local current transformers lying at one end of the protection zone and a second group of three remote current transformers lying at another end of the protection zone, each current transformer being electrically coupled to a phase of the electrical power system and having a current differential protection relay electrically coupled thereto, the method comprising the step of operating each protection relay according to the steps of establishing a fault condition by discriminating between an internal fault inside the protection zone and an external fault outside the protection zone; and modifying the sensitivity of the protection relay according to the nature of the fault condition including increasing the sensitivity following establishment of an internal fault condition and decreasing the sensitivity following establishment of an external fault condition.

18. A method of protecting a protection zone of a three phase electrical power system according to claim 17 wherein first and second design threshold values are determined by $$\frac{A \times fs}{fc}$$

where A is a proportion of the secondary rated current of the current transformer to which a given protection relay is electrically coupled, fs is a frequency at which sampling of bias and differential currents of the protection relay occurs, and fc is a frequency at which the protection relays communicate with one another.

19. A method of protecting a protection zone of a three phase electrical power system according to claim 17 further including increasing the angle of inclination of the bias characteristic slope of each protection relay by a common factor following establishment of an external fault condition.

20. A method of protecting a protection zone of a three phase electrical power system according to claim 19 including determining the common factor by summing the magnitude of the index values for each pair of protection relays of a given phase, and taking the maximum summed value of the three pairs of protection relays.

21. A method of protecting a protection zone of a three phase electrical power system according to claim 17 further, including decreasing the angle of inclination of the bias characteristic slopes of each pair of protection relays of a given phase by a factor equal to the sum of the magnitude of the index values for the pair of protection relays following establishment of an internal fault condition.

22. A method of protecting a protection zone of a three phase electrical power system according to claim 21 further including the step of applying a lower limit of 0 to the angle of inclination of the bias characteristic slopes of each pair of protection relays of a given phase.

23. A current differential protection relay comprising:

a fault discriminator module to establish a fault condition by discriminating between an internal fault inside a protection zone of an electrical power system and an external fault outside the protection zone; and a sensitivity modifying module to modify the sensitivity of the protection relay according to the nature of the fault condition, the modification of the sensitivity including increasing the sensitivity following establishment of an internal fault condition and decreasing the sensitivity following establishment of an external fault condition.

* * * * *